United States Patent Office 3,171,110
Patented Feb. 23, 1965

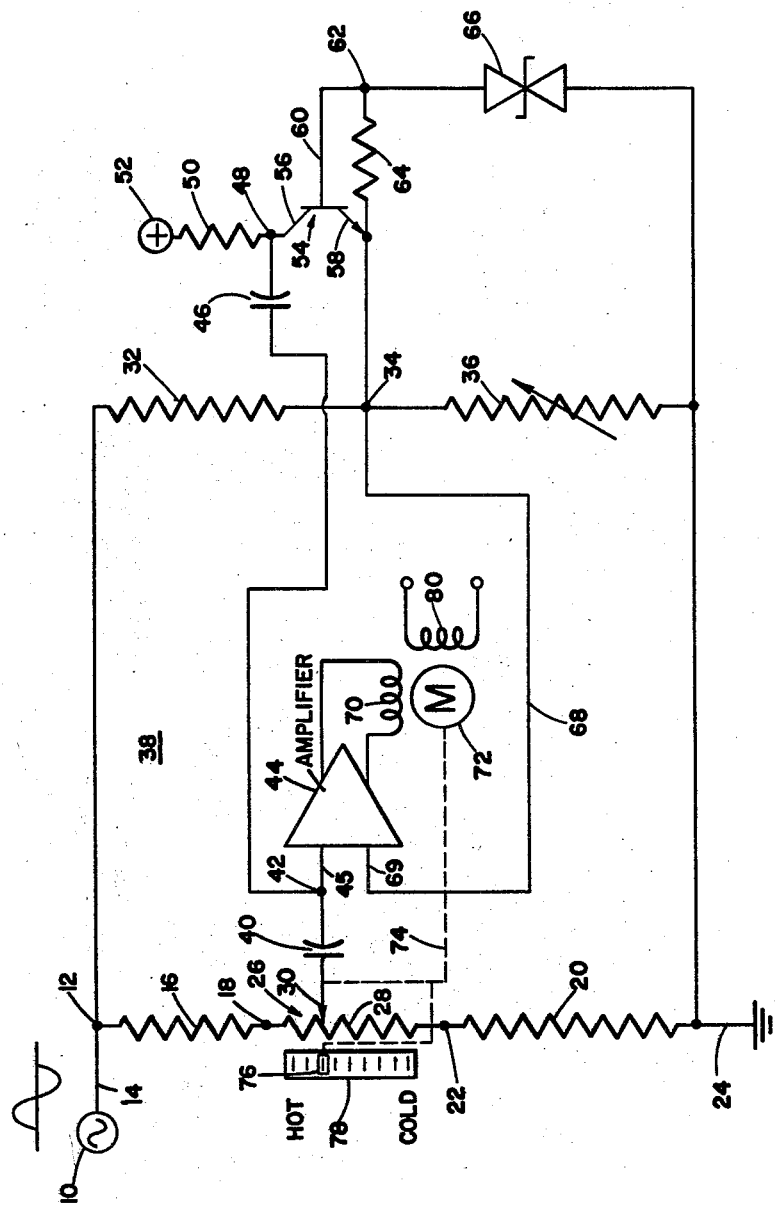

3,171,110
CONTROL APPARATUS
Robert P. Pearson, Roseville, Minn., assignor to Honeywell Inc., a corporation of Delaware
Filed Aug. 22, 1961, Ser. No. 133,207
4 Claims. (Cl. 340—233)

The present invention relates generally to safe failure apparatus and more specifically to an indicator which will fail in a so-called "safe" or "cold" condition whether the condition sensor opens on failure or shorts on failure.

There are many situations in which the failure of the condition sensing apparatus or condition sensor will provide a danger signal and could bring about many lost hours of production time in the case of a production plant or could mean the destruction of an airplane in the case of aircraft instruments. This lost time or destruction depending upon the application of the apparatus would be a complete waste in conditions where the danger was not actually present but only thought to be present due to the failure of the condition sensing apparatus.

In the past, airplane pilots have had to decide whether or not an engine was overheated or whether an indicator had failed. Normally, abandonment of the airplane was declared when such an indication was presented. If actually only the indicator had failed, this action on the part of the crew meant destruction of the airplane when the engines were working properly. The present invention overcomes this problem by providing a "cold" indication upon failure of the sensing element in either an open or shorted condition and still gives a "hot" indication if the environment is actually hot.

This invention however can be used in other indicators than temperature indicators and in industrial applications far removed from any aircraft indicating problems.

It is therefore an object of this invention to provide new and novel apparatus for providing a so-called "safe" failure of apparatus in all applications wherein "safe" failure is desirable.

The various features of novelty which characterize my invention are pointed out with particularity in the claims annexed to and forming a part of this specification. For a better understanding of the invention along with its advantages and more specific objects, reference should be had to the accompanying drawing and specification.

The single figure shows a circuit diagram of the apparatus used to carry out the teachings of this invention.

In the drawing terminal 10 is used to designate the terminal to which alternating power is applied. A junction point 12 is attached to the terminal 10 by a lead 14. A resistance element 16 is attached between the junction point 12 and a junction point 18. A resistance element 20 is shown connected between a junction point 22 and ground 24. A variable resistor or potentiometer 26 is shown with a resistance element 28 and a wiper 30. The potentiometer has its resistance element 28 connected between the junction points 18 and 22. A temperature stable resistance element 32 is connected between the junction point 12 and a junction point 34. A temperature sensitive variable resistor or condition sensor 36 is shown connected between the junction point 34 and ground 24. The resistors 16, 20, 32, and the potentiometer or variable resistor 26 along with the condition sensor 36 combine to form a bridge circuit 38. A capacitor 40 is shown with one lead connected to the wiper 30 of potentiometer 26 and the other lead connected to a junction point 42. The junction point 42 is connected to a first input of an amplifier 44 by a lead 45 and also to one lead of a capacitor 46 which has its other lead connected to a junction point 48. A resistance element 50 is connected between the junction point 48 and a positive power supply terminal or direct current power supplying means 52.

An NPN transistor 54 is shown with a collector 56 connected to the junction point 48 and an emitter 58 connected to the junction point 34. A base 60 of the transistor 54 is connected to a junction point 62. A resistance element 64 is connected between the junction point 34 and the junction point 62. A double anode Zener diode 66 is shown connected between the junction point 62 and ground 24. A lead 68 connects a second lead 69 of the amplifier 44 to the junction point 34. The junction point 34 provides one of the output terminals of the bridge circuit 38. The wiper 30 provides the other output terminal for the bridge circuit 38. The output of the amplifier 44 is connected to a winding 70 of a motor 72 which has a mechanical connection 74 adapted to move the wiper 30 and an indicating pointer 76 on the potentiometer 26 and on an indicator 78 respectively. The motor 72 has a field winding 80 which is connected to a power source not shown.

In operation the condition sensing circuit or automatic indicating bridge circuit means, which would include the bridge circuit 38 along with the indicator 78, the amplifier 44, the capacitor 40, and the motor 72, operates in a normal or known fashion which is old to those skilled in the art. It may be assumed that the temperature sensitive resistor 36 is at a given point to provide a voltage at junction point 34 which is exactly half of the voltage between ground 24 and the power input terminal 10. If the wiper 30 is at such a position on the potentiometer 26 to provide the same voltage with respect to ground there will be no resulting action in the condition sensing circuit. If, however, the temperature or environment changes in which the condition sensor 36 is located, the voltage at the junction point 34 will either raise or lower. If it be assumed that the voltage at junction point 34 were to lower, there would be a voltage applied to the amplifier 44 between the junction points 34 and 30 such that on a positive half cycle of input voltage at terminal 10, the wiper 30 would be at a higher voltage than the junction point 34. If this happens an input voltage would be applied to the amplifier 44 and the motor 72 would move the wiper 30 and reposition it at a lower point on the resistance element 28 to produce a minimum input voltage to the amplifier 44. At the same time that the wiper 30 is moved, the point 76 is moved along the indicator 78 to provide a new temperature or condition reading. If the temperature of the environment changes to raise the voltage at junction point 34 the opposite conditions will prevail and the wiper 30 and the indicator pointer 76 will move in an upward direction to again provide minimum input voltage to the amplifier 44. If the condition sensor 36 were to fail in a shorted condition the junction point 34 would be brought down to the voltage of the ground point 24 and this voltage would react to produce an output signal from the amplifier 44 such that the motor 72 would bring the wiper 30 as far down scale as possible and thereby give a cold indication on the indicator 78. If, however, the condition sensor 36 were to fail in an open condition the junction point 34 would raise to the voltage of the input terminal 10. Under this condition a voltage of phase and amplitude would appear between the junction point 34 and the wiper 30 such that the combination of the amplifier 44 and the motor 72 would raise the wiper 30 and the indicator pointer 76 upward to indicate a hot condition. This would be a false reading if the environment really were not hot. Although the cold indication of the pointer 76 when the condition sensor 36 failed in a shorted condition would also be false, the cold indication is considered to be a safe indication in that the personnel observing the indicator will know that something is probably wrong with the indicating unit and will not have to decide whether the indicator is at fault or whether there is actually a dangerous condition existing at the point which the indicating apparatus is monitoring. With the addition of the voltage sensitive detecor means which may consis of the resistor 64 and the Zener diode 66 or these two elements and the transistor or amplifier 54 the indicator can be adapted to produce a cold indication in either condition of failure of the sensing element 36. The breakdown voltage of the double anode Zener diode 66 is high enough that current will not flow through the Zener diode 66 in normal conditions of the bridge 38. If the condition sensor 36 opens, the voltage at junction point 34 will change to approximately the same voltage as appears at the input terminal 10. On the positive half cycle current will flow from the junction point 12 through the resistors 16 and 20 and the potentiometer 26 in the normal fashion. The current, under the new conditions, will also flow from the junction point 12 through resistor 32, the resistor 64, and Zener diode 66. Since in this particular application an NPN transistor is used the transistor will not turn to an "on" condition and nothing more will happen on this half cycle except that the signal between wiper 30 and the junction point 34 is such that the wiper 30 and the indicator pointer 76 might start moving in the upward or hot direction if the motor has a very low response time. Normally, however, the motor and associated gear train would not move in a single half cycle.

In the next half cycle the junction point 12 will go negative with respect to ground 24. At this time current will flow through the double anode Zener diode 66 through the resistor 64 and the resistor 32 to the terminal 10 which is now negative with respect to ground. This direction of current flow will produce a bias across transistor 54 such that it will start conducting. When the transistor 54 starts conducting, the potential on collector 48 will go in a direction towards ground. This voltage transient coupled through the capacitor 46 to the input lead 45 of the amplifier 44 will produce a large signal which is much larger than the signal obtained from the bridge circuit 38 and will override the signal obtained therefrom. The indicator 76 and the wiper 30 will immediately start moving in the cold direction. Even though the signal obtained from the amplifier represented in this case by the single transistor 54 is only a half wave signal, the RMS value of this signal is much larger than that obtained between the junction point 34 and the wiper 30 and therefore the voltage responsive means consisting of the amplifier 44 and the motor 72 will keep the indication at a cold position and provide a so-called "safe" indication.

In the claims and specification, the terms used may have meanings somewhat out of the ordinary context. An attempt will be made to define these words to be consistent with their use in the specification and claims. The terms "hot" and "unsafe" as used herein, refer to a condition of the environment or apparatus being sensed which, if actually present, would be highly undesirable. Referring specifically to the embodiment shown in this invention, if sensor 36 fails in the open condition, and the detector circuit is not used, an indication will be provided which is at the top or "hot" portion of the scale 78. Although the indication will appear, the apparatus will not be in this unsafe condition. "Cold" and "safe" are the terms used to describe the indication obtained when the detector circuit is operating and detects the "open" failure of the sensor 36. While the apparatus is not actually cold, if this type of indication is actually obtained, it will be realized that there is a failure in the detector and that the apparatus, which is still being used, can not possibly be in the "cold" condition. The terms "open" and "shorted" refer to the types of failure of the sensor 36. With some types of temperature sensitive resistors, the ends of the sensor 36 connected to junction 34 and ground 24 can become connected together and thereby short out the rest of the resistance element. At other times, due to vibration or overheating, the resistance element or sensor 36 can weaken and separate or "open." Where the term "normal" is used in the specification and the claims, it is intended to mean the signal obtained from the bridge circuit 38 when the sensor 36 is in a usable operating condition. By this it is meant that sensor 36 is not in an "open" or "shorted" condition. When the term "override" is used, as applied to the embodiment shown, it is intended to describe the conditions occurring when sensor 36 opens and the signal obtained from transistor 54 is applied to amplifier 44. This signal is of a larger amplitude and is from the opposite phase of the signal being obtained from bridge circuit 38. The detector circuit signal "overcomes" or "overrides" the bridge circuit to drive the indicator to the "safe" or "cold" indication.

While I have shown and described one particular circuit which is used as a temperature indicator in an aircraft it is to be understood that the invention is not limited to temperature indicators or to aircraft indicators. It is also to be understood that the amplifier which in this case consists of the transistor 54 is not limited to an NPN transistor or to transistor amplifiers but includes any means for applying the signal to an input of the amplifier which is part of the normal automatic indicating bridge. I have shown this particular circuit only by way of example and I wish to be limited only by the appended claims.

I claim:

1. In a fail-safe circuit: alternating power signal supplying means; automatic indicating bridge circuit means comprising temperature sensitive resistance means, substantially temperature stable resistance means, variable resistance means, all of said aforementioned resistance means being connected to form a bridge circuit, and said bridge circuit being connected for providing an output signal between a wiper on said variable resistance means and a junction point connecting said temperature sensitive resistance means and said temperature stable resistance means, voltage responsive means, including input summing means, and output means connected to receive said output signal from said bridge circuit at said input summing means and adapted to vary the position of said wiper on said variable resistance means to provide a minimum input signal to said voltage responsive means, and indicator means adapted to vary in accordance with said wiper means to give a temperature indication, said automatic indicating bridge circuit means providing a "Hot" indication on said indicator means when said temperature sensitive resistor fails in an open condition; means connecting said alternating power signal supplying means to said automatic indicating bridge circuit means; Zener diode means connected in parallel with said temperature sensitive resistance means and adapted to allow current flow therethrough when said temperature sensitive resistance means opens; amplifier means including input and output means connected to give an output signal when current flows through said Zener diode, said signal being substantially 180° out of phase compared to said signal supplied to said voltage responsive means from said bridge circuit; and means connecting said output means of said amplifier means to said input summing means of said voltage responsive means, said output signal from said amplifier means being of sufficient magnitude to override said output signal from said bridge circuit upon failure of said temperature sensitive resistance means in an "open" condition to drive said indicator means to a "Cold" indication so as to provide safe failure.

2. In a fail-safe circuit: automatic indicating bridge circuit means comprising temperature sensitive resistance means, substantially temperature stable resistance means, variable resistance means, all of said aforementioned resistance means being connected to form a bridge circuit, and said bridge circuit being connected for providing an output signal between a wiper on said variable resistance means and a junction point connecting said temperature sensitive resistance means and said temperature stable resistance means, first amplifier means including input and output means connected to receive said output signal from said bridge circuit, motor means connected to receive said output signal from said first amplifier means and adapted to vary the position of said wiper on said variable resistance means to provide a minimum input signal to said first amplifier means, and indicator means adapted to vary in accordance with said wiper means to give a temperature indication, said automatic indicating bridge circuit means providing a "Hot" indication on said indicator means when said temperature sensitive resistor fails in an open condition; means connected for supplying alternating power to said automatic indicating bridge circuit means; Zener diode means connected in parallel with said temperature sensitive resistance means and adapted to allow current flow therethrough when said temperature sensitive resistance means opens; second amplifier means including input and output means connected to give an output signal when current flows through said Zener diode, said signal being susbtantially 180° out of phase compared to said signal supplied to said first amplifier means from said bridge circuit; and means connecting said output means of said second amplifier means to said input means of said first amplifier, said output signal from said second amplifier being of sufficient amplitude to override said output signal from said bridge circuit upon failure of said temperature sensitive resistance means in an "open" condition and thus to drive said indicator means to a "Cold" indication so as to provide safe failure.

3. In a fail-safe circuit: alternating power signal supplying means; automatic indicating bridge circuit means comprising temperature sensitive resistance means, substantially temperature stable resistance means, variable resistance means, all of said aforementioned resistance means being connected to form a bridge circuit, said bridge circuit being connected to said alternating power signal supplying means and being adapted to provide an output signal between a wiper on said variable resistance means and a junction point connecting said temperature sensitive resistance means and said temperature stable resistance means, first amplifier means, including first and second input means and output means, means connecting said output means from said bridge circuit means to said first input means of said first amplifier means, motor means connected to receive said output signal from said first amplifier means and adapted to vary the position of said wiper on said variable resistance means to provide a minimum input signal to said first amplifier means, and indicator means adapted to vary in accordance with said wiper means to give a temperature indication, said automatic indicating bridge circuit means providing an unsafe "Hot" indication on said indicator means when said temperature sensitive resistor fails in an open condition; Zener diode means connected in parallel with said temperature sensitive resistance means and adapted to allow current flow therethrough when said temperature sensitive resistance means fails in an open condition; direct current power supplying means; second amplifier means including input and output means connected to said direct current power supplying means and connected to give an output signal when current flows through said Zener diode, said signal being substantially 180° out of phase compared to said signal supplied to said first amplifier means from said bridge circuit; and means connecting said output means of said second amplifier means to said second input means of said first amplifier, said output signal from said second amplifier being of sufficient magnitude to override said output signal from said bridge circuit when said temperature sensitive resistor fails in an open condition and thus to drive said indicator means away from said to a "Cold" indication so as to provide safe failure.

4. In fail-safe circuitry: condition sensing circuit means including a condition sensor, input means and output means, said condition sensing circuit being adapted for providing a first output signal of a first phase upon failure of said condition sensor in a "shorted" condition and adapted for providing a second output signal of a phase opposite said first phase upon failure of said condition sensor in an "open" condition; means connected to said input means of said condition sensing circuit for supplying alternating power thereto; indicating means including input means connected for receiving output signals from said output means of said condition sensing circuit means, said indicating means being adapted for providing an "unsafe" indication upon receipt of one of said first and said second signals at said input means and for providing a "safe" indication upon receipt of the other of said first and said second signals at said input means; detector means connected to said condition sensing circuit, said detector means being adapted for providing an output signal upon failure of said condition sensor in a condition to provide an "unsafe" indication at said indicating means, said output signal of said detector means being of amplitude and phase sufficient to override the signal being applied to said indicating means by said condition sensing circuit; and means connecting said detecting means to said indicating means for applying the detector output signal to said input means of said indicating means to drive said indicator means toward the "safe" indication.

References Cited by the Examiner

UNITED STATES PATENTS 2,691,889 10/54 Dion et al. _____ 340—227 X
2,832,946  4/58 Beck _____ 340—233 X
2,908,829 10/59 Schaeve.

NEIL C. READ, *Primary Examiner.*